No. 730,800. Patented June 9, 1903.

UNITED STATES PATENT OFFICE.

PAUL E. SCHOENFELDER, OF NEWARK, NEW JERSEY, ASSIGNOR TO M. BAUER, OF MONTCLAIR, NEW JERSEY.

COMBINED PRINTING AND TONING COMPOUND.

SPECIFICATION forming part of Letters Patent No. 730,800, dated June 9, 1903.

Application filed September 19, 1902. Serial No. 124,103. (No specimens.)

*To all whom it may concern:*

Be it known that I, PAUL E. SCHOENFELDER, a citizen of the United States, residing at Newark, in the county of Essex and State of New Jersey, have invented certain new and useful Improvements in a Combined Printing and Toning Compound; and I do declare the following to be a full, clear, and exact description of the invention, such as will enable others skilled in the art to which it appertains to make and use the same.

The object of this my invention is to provide a chemical solution with which may be prepared a kind of paper (more particularly a glazed paper) or other similar material upon which a photographic impression may be made from a negative plate and upon which tone and impression are simultaneously made, thus doing away with the ordinary toning treatment, and which will furnish a picture of a bluish-black cast.

My invention is based upon the formation of a chemical compound so far unknown in connection with the art of photography and containing as its basis fulminating-gold.

My composition contains the following ingredients:

(A) Collodion, (two and one-half per cent. gun-cotton,) four ounces; fulminating-gold prepared from one grain gold chlorid and one minim of twenty-six per cent. ammonia-water; lithium chlorid, three grains, (or an equivalent quantity of other chlorid.)

(B) Silver nitrate, forty-five grains; glycerin, forty-five minims; rectified alcohol, one hundred and fifty minims.

(C) Pour B into A and shake thoroughly.

(D) Citric acid, fifteen grains, dissolved in alcohol, sixty minims. Add to C and shake well.

(F) Add to D fifteen minims castor-oil previously dissolved in alcohol, sixty minims.

The above "emulsion" is applied to the surface of the material perfectly dried beforehand, upon which the photograph is to be printed. After exposure the print is placed for five to ten minutes into a solution composed of sodium chlorid, one part in thirty parts distilled water, then into a fixing solution consisting of sodium hyposulfite, one part in fifteen parts of distilled water, for a period of, say, ten minutes. After this treatment the print is well washed in pure water. The picture is now ready to be mounted without any additional treatment, as the toning and the printing are done together at the same time. It presents a beautiful appearance of a bluish-black tone not prone to turning yellow nor fading on exposure to light.

Instead of solution A a solution of gelatin, one part, and pure water, three parts, can be used, in which case the ingredients named under B, C, and D are dissolved in water instead of alcohol.

Having thus described my invention, what I claim is—

1. A chemical composition to be used for preparing the surface of suitable material for photographic purposes, consisting of fulminating-gold, silver nitrate, a holding substance, and citric acid, substantially as described.

2. A chemical composition to be used for preparing the surface of suitable material for photographic prints, consisting of fulminating-gold, silver nitrate, a holding substance, citric acid, glycerin, and ammonia, substantially as described.

3. A chemical composition to be used for preparing the surface of suitable material for photographic prints, consisting of a holding substance, fulminating-gold, silver nitrate, a chlorid, a softening ingredient, and citric acid, substantially as described.

4. A chemical composition to be used for preparing the surface of suitable material for photographic prints, consisting of fulminating-gold, silver nitrate, a holding substance, an organic acid, and glycerin, substantially as described.

5. A chemical composition to be used for preparing the surface of suitable material for photographic prints, consisting of a holding substance, fulminating-gold, silver nitrate, a chlorid, a softening ingredient, and an organic acid substantially as described.

6. A sensitizing solution containing fulminating-gold.

7. A sensitizing solution containing fulminating-gold and an organic acid.

8. A sensitizing solution containing fulminating-gold and citric acid, substantially as described.

9. A chemical composition to be used for preparing the surface of suitable material for photographic purposes, consisting of fulminating-gold, silver nitrate, and a holding substance, substantially as described.

10. A chemical composition to be used for preparing the surface of suitable material for photographic purposes, consisting of fulminating-gold, silver nitrate, a holding substance, an organic acid, and a chlorid, substantially as described.

11. A chemical composition to be used for preparing the surface of suitable material for photographic purposes, consisting of fulminating-gold, silver nitrate, an organic acid, a chlorid, and a softening ingredient, substantially as described.

12. A chemical composition to be used for preparing the surface of suitable material for photographic purposes, consisting of fulminating-gold, silver nitrate, a holding substance, an organic acid, a chlorid, a softening ingredient, and ammonia, substantially as described.

In testimony whereof I have hereunto set my hand in presence of two subscribing witnesses.

PAUL E. SCHOENFELDER.

Witnesses:
  HERMANN BAUER,
  AUGUST DRESCHER.